United States Patent Office 2,950,270
Patented Aug. 23, 1960

2,950,270

RUBBERY DIENE TERPOLYMERS

Earl C. Chapin, Springfield, and Weston P. Sanford, Kingston, Mass., assignors to Monsanto Chemical Company, St. Louis, Mo., a corporation of Delaware No Drawing. Filed June 27, 1956, Ser. No. 594,084

7 Claims. (Cl. 260—80.7)

The present invention relates to rubbery diene terpolymers. More particularly, the present invention relates to rubbery diene terpolymers containing hydroxyl groups and to methods for preparing such terpolymers.

It would be desirable to have high molecular weight rubbery diene polymers containing hydroxyl groups in their chemical structure. Because of the presence of hydroxyl groups, such rubbery polymers would have high resistance to oil and other hydrocarbon solvents. Prior attempts to prepare such polymers by interpolymerizing conjugated 1,3-dienes and unsaturated alcohols have been unsuccessful.

It is an object of this invention to provide novel rubbery diene polymers.

Another object of this invention is to provide rubbery diene polymers containing hydroxyl groups in their chemical structure.

A further object of this invention is to provide a method for preparing rubbery diene polymers containing hydroxyl groups in their chemical structure.

Other objects and advantages of this invention will become apparent from the following detailed description thereof.

In accordance with the present invention there is provided a new class of rubbery diene polymers which are interpolymers of (1) a conjugated 1,3-diene, (2) an ester or nitrile of an acrylic acid, and (3) an allyl alcohol. Such interpolymers are prepared by emulsifying a suitable mixture of a conjugated 1,3-diene, an ester or nitrile of an acrylic acid and an allyl alcohol in water and heating the resulting emulsion in the presence of a free radical generating polymerization initiator.

The following examples are set forth to illustrate more clearly the principle and practice of this invention to those skilled in the art. All parts are by weight.

*Example 1*

An interpolymer of butadiene, acrylonitrile and allyl alcohol is prepared employing the polymerization recipe set forth below:

| Component: | Parts |
|---|---|
| Butadiene | 60 |
| Acrylonitrile | 31 |
| Allyl alcohol | 9 |
| Water | 170 |
| Potassium stearate | 4.0 |
| Potassium chloride | 0.3 |
| Sodium salt of bis(sulfonaphthyl)methane | 0.5 |
| Potassium persulfate | 0.2 |
| Dodecyl mercaptan | 0.5 |

The polymerization is carried out by heating the above reactants with stirring for 8 hours at 40° C., and at this point the polymerization is stopped by adding a commercially available polymerization shortstop to the polymer emulsion. The polymer is coagulated by adding an aqueous solution of aluminum sulfate to the latex and the rubber is then dried at 80° C. for 5 hours. A conversion of 63% is obtained and the polymer analyzes 58% butadiene, 38% acrylonitrile and 7% allyl alcohol. When the polymer is vulcanized employing conventional butadiene-acrylonitrile rubber vulcanization recipes, tough snappy vulcanizates are obtained.

*Examples II–VII*

Example I is repeated except that the monomers charged therein are replaced with the monomer mixtures set forth in the table below:

| Example | II | III | IV | V | VI | VII |
|---|---|---|---|---|---|---|
| Component: | | | | | | |
| Butadiene | 50 | | 60 | 60 | 70 | 75 |
| Isoprene | | 65 | | | | |
| Allyl Alcohol | 20 | 10 | | 10 | | 5 |
| Methallyl Alcohol | | | 10 | | 5 | |
| Acrylonitrile | 30 | 25 | | 15 | | 20 |
| Ethyl Acrylate | | | 30 | | | |
| Butyl Acrylate | | | | 15 | | |
| Methyl Methacrylate | | | | | 25 | |

In each case tough rubbery polymers are obtained.

The interpolymers of this invention consist of (1) a conjugated 1,3-diene, (2) an ester or nitrile of an acrylic acid, and (3) an allyl alcohol. Butadiene and isoprene are conjugated 1,3-dienes most frequently employed in the interpolymers, but other conjugated 1,3-dienes that contain only the elements of carbon and hydrogen may also be employed, e.g., 2,3-dimethyl butadiene. The acrylic acid derivatives to be employed may be either a nitrile or a saturated aliphatic alcohol ester of acrylic acid or methacrylic acid. Where the acrylic and methacrylic acid esters are employed, preferably they are the esters derived from saturated aliphatic alcohols containing fewer than 5 carbon atoms, e.g., methyl acrylate, ethyl acrylate, propyl acrylate, butyl acrylate, and the corresponding esters of methacrylic acid. The allyl alcohol included in the interpolymers may be allyl alcohol itself or methallyl alcohol. With respect to each component of the interpolymers, mixtures of suitable monomers may be employed in lieu of a single monomer if desired.

The interpolymers of this invention contain 40–95 weight percent of the conjugated 1,3-diene, 3–40 weight percent of the ester or nitrile of an acrylic acid and 2–20 weight percent of the allyl alcohol. In a preferred embodiment of the invention the interpolymers contain 55–85 weight percent of the conjugated 1,3-diene, 10–30 weight percent of the ester or nitrile of an acrylic acid and 5–15 weight percent of the allyl alcohol.

The interpolymers of the invention are prepared by polymerizing a suitable mixture of the 3 monomer components in an aqueous emulsion polymerization system of the type employed in copolymerizing conjugated 1,3-dienes with acrylate esters or acrylonitrile. Such polymerization systems are well known in the art and, consequently, are not set forth herein in detail.

The interpolymers of this invention can be formulated and vulcanized with conventional rubber compounding ingredients by techniques well known in the art. The resulting vulcanizates have excellent elastomeric properties and in particular have excellent resistance to hydrocarbon solvents such as gasoline and oil. For this reason, the interpolymers have particular utility in the manufacture of mechanical rubber goods such as gasoline and oil hose, gaskets, O-rings, etc. The interpolymers also have excellent compatibility with thermosetting resins such as phenol-, urea-, and melamine-condensates and may be admixed therewith in the manufacture of resin based coating compositions, adhesive formulations, etc.

The above descriptions and particularly the examples are set forth by way of lilustration only. Many other variations and modifications thereof will be apparent to those skilled in the art and can be made without departing from the spirit and scope of the invention herein described.

What is claimed is:

1. An interpolymer of monomers consisting of (a) from 40 to 95 weight percent of a conjugated 1,3-diene selected from the group consisting of butadiene, isoprene, 2,3-dimethyl butadiene and mixtures thereof, (b) from 3 to 40 weight percent of an acrylic acid derivative of the group consisting of saturated 1-5 carbon atom aliphatic alcohol esters of acrylic acid, saturated 1-5 carbon atom aliphatic alcohol esters of methacrylic acid, acrylonitrile, methacrylonitrile and mixtures thereof, and (c) from 2 to 20 weight percent of an unsaturated alcohol of the group consisting of allyl alcohol, methallyl alcohol and mixtures thereof.

2. An interpolymer of monomers consisting of (a) from 55 an 85 weight percent of a conjugated 1,3-diene selected from the group consisting of butadiene, isoprene, 2,3-dimethyl butadiene and mixtures thereof, (b) from 10 to 30 weight percent of an acrylic acid derivative of the group consisting of saturated 1-5 carbon atom aliphatic alcohol esters of acrylic acid, saturated 1-5 carbon atom aliphatic alcohol esters of methacrylic acid, acrylonitrile, methacrylonitrile and mixtures thereof, and (c) from 5 to 15 weight percent of an unsaturated alcohol of the group consisting of allyl alcohol, methallyl alcohol and mixtures thereof.

3. An interpolymer as in claim 2 wherein the conjugated 1,3-diene is butadiene.

4. An interpolymer as in claim 2, wherein the acrylic acid derivative is acrylonitrile.

5. An interpolymer as in claim 2 wherein the unsaturated alcohol is allyl alcohol.

6. An interpolymer of monomers consisting of from 55 to 85 weight percent of butadiene, from 10 to 30 weight percent of acrylonitrile and from 5 to 15 weight percent of allyl alcohol.

7. A process for preparing an interpolymer of monomers consisting of (a) from 40 to 95 weight percent of a conjugated 1,3-diene selected from the group consisting of butadiene, isoprene, 2,3-dimethyl butadiene and mixtures thereof, (b) from 3 to 40 weight percent of an acrylic acid derivative of the group consisting of saturated 1-5 carbon atom aliphatic alcohol esters of acrylic acid, saturated 1-5 carbon atom aliphatic alcohol esters of methacrylic acid, acrylonitrile, methacrylonitrile and mixtures thereof, and (c) from 2 to 20 weight percent of an unsaturated alcohol of the group consisting of allyl alcohol, methallyl alcohol and mixtures thereof, which comprises polymerizing a mixture of said monomers in an aqueous emulsion containing a free radical generating polymerization initiator; said monomeric mixture containing said monomers in substantially the same proportions as desired in the interpolymer.

References Cited in the file of this patent

UNITED STATES PATENTS 2,476,341   Weber _____ July 19, 1949

FOREIGN PATENTS 590,035   Great Britain _____ July 7, 1947

OTHER REFERENCES

Allyl Alcohol, Technical Publication S.C.: 46-32, Shell Chemical Corp., 100 Bush Street, San Francisco 6 (1946), pages 26 and 27 only relied on.

UNITED STATES PATENT OFFICE
CERTIFICATE OF CORRECTION

Patent No. 2,950,270                                                           August 23, 1960

Earl C. Chapin et al.

It is hereby certified that error appears in the printed specification of the above numbered patent requiring correction and that the said Letters Patent should read as corrected below.

Column 3, line 18, for "55 an 85" read -- 55 to 85 --.

Signed and sealed this 4th day of April 1961.

(SEAL)
Attest: ERNEST W. SWIDER

X̶X̶X̶X̶X̶X̶X̶X̶X̶X̶
K̶A̶R̶L̶ ̶H̶.̶ ̶A̶X̶L̶I̶N̶E̶

Attesting Officer

ARTHUR W. CROCKER
Acting Commissioner of Patents